United States Patent
Corghi

(10) Patent No.: US 8,274,648 B2
(45) Date of Patent: Sep. 25, 2012

(54) DEVICE AND A METHOD FOR CHECKING AN ATTITUDE OF A VEHICLE

(75) Inventor: Remo Corghi, Correggio (IT)

(73) Assignee: Corghi S.p.A., Correggio (Reggio Emilia) (IT)

( * ) Notice: Subject to any disclaimer, the term of this patent is extended or adjusted under 35 U.S.C. 154(b) by 184 days.

(21) Appl. No.: 12/740,312

(22) PCT Filed: Sep. 16, 2008

(86) PCT No.: PCT/EP2008/062277
§ 371 (c)(1),
(2), (4) Date: Apr. 28, 2010

(87) PCT Pub. No.: WO2009/056392
PCT Pub. Date: May 7, 2009

(65) Prior Publication Data
US 2010/0321674 A1    Dec. 23, 2010

(30) Foreign Application Priority Data
Oct. 29, 2007    (IT) .............................. RE2007A0116

(51) Int. Cl.
*G01B 11/26* (2006.01)

(52) U.S. Cl. ............................... 356/139.09; 356/139.01
(58) Field of Classification Search ........ 356/3.01–28.5, 356/139.01–139.1
See application file for complete search history.

(56) References Cited

U.S. PATENT DOCUMENTS

| | | | |
|---|---|---|---|
| 6,072,433 A | 6/2000 | Young et al. | |
| 6,456,372 B1 | 9/2002 | Hudy | |
| 6,972,433 B2 | 12/2005 | Miyasaka | |
| 7,658,797 B2 | 2/2010 | Guevara et al. | |
| 7,957,562 B2 * | 6/2011 | Chang et al. | 382/113 |
| 2007/0132861 A1 * | 6/2007 | Furuki | 348/231.3 |
| 2009/0059201 A1 * | 3/2009 | Willner et al. | 356/5.01 |
| 2009/0073425 A1 * | 3/2009 | Kling et al. | 356/139.09 |

FOREIGN PATENT DOCUMENTS
WO    2006052684 A    5/2006
* cited by examiner

*Primary Examiner* — Luke Ratcliffe
(74) *Attorney, Agent, or Firm* — Browdy and Neimark, PLLC

(57) ABSTRACT

A device and a method for checking an attitude of a vehicle (100), comprising at least a measuring instrument (3) for measuring at least one characteristic attitude parameter, in which the measuring instrument (3) is installed on board a self-propelled unit (2) which moves autonomously on the ground, in such a way as to follow variable trajectories.

20 Claims, 9 Drawing Sheets

DEVICE AND A METHOD FOR CHECKING AN ATTITUDE OF A VEHICLE

TECHNICAL FIELD

The invention concerns a device and a method for checking the attitude of a vehicle.

It is important to periodically check vehicle attitude to ensure superior road-holding performance and the best driving comfort.

In fact road-holding performance depends on a vehicle's adherence to the road, which in turn is mainly a function of two factors: the area of contact between the wheels and the road surface, and wheel drift, both factors which depend on the geometry of the vehicle frame and suspension. The geometry of a frame provided with suspension is defined by characteristic attitude parameters, including the characteristic angles of the wheels, the wheel-base and track width, together with other parameters such as for example the length of the suspensions. The correct values for these parameters are established by the vehicle maker and generally differ according to the type and model of vehicle.

Checking the attitude of a vehicle means periodically measuring the real values of the above-mentioned characteristic parameters, so as to be able to modify the values if required and reinstate the correct values.

BACKGROUND ART

The devices used to check attitude are therefore based on an appropriate measuring system, which measures the values upon which the characteristic attitude parameters depend. The measured values are then transmitted to a processor which uses known mathematical/geometrical algorithms to calculate the characteristic angles of the wheels, and other attitude parameters if required, compares them with the correct values which are stored in its memory, relative to the vehicle model being worked on, and finally calculates the corrections necessary to restore the values to the permitted values, displaying the corrections on a monitor, and also printing a paper copy if required.

The detection systems at present in use can be grouped into two categories: those which effect measurements through direct contact with the wheels, and those which effect measurement without direct contact with the wheels.

Detection systems belonging to the first category generally comprise a plurality of operating heads, each of which can be attached to a relative wheel of the vehicle, and is provided with appropriate mechanical or electronic angle transducers, which detect its position and orientation. Data detected by the operating heads can be transmitted to the processor via cable or through a wireless system, for example via radio or via infrared light. In detection systems belonging to the second category, the operating heads are replaced by measuring instruments which are generally of the opto-electric type, based on acquiring and subsequently processing images of the wheel tracked by one or more video cameras.

In the images taken by the video cameras, the opto-electronic measuring instruments detect the positions of appropriate targets which are associated to the wheel, in such as way as to determine the equation of the plane or of the axis of rotation of the wheel in a predetermined frame of reference installed in the measuring instrument.

The targets can be appropriately shaped physical bodies, fixed to the wheels of the vehicle before performing the measurement, or they can be produced by projecting laser or structured light beams onto the wheels of the vehicle, which beams can give rise to simple luminous lines which radially cross the wheels, or more complex and appropriately coded patterns.

Opto-electronic measuring instruments also exist which do not use any type of encoded target, since in the images tracked by the video cameras they identify the position of lines actually on the wheels themselves, such as for example the separation border between the rim and the tyre. An instrument of this type is described in European patent application EP0895056 in the name of the same Applicant.

Whatever detection technique is used, opto-electronic measuring instruments are usually installed on appropriate fixed structures, from which they locate the targets associated to the wheels of the vehicle, or alternatively, they, are installed on portable structures which can be moved and positioned as desired by an operator, so as to situate the measuring instruments in appropriate positions in relation to the wheels of the vehicle to be measured. Intermediate solutions are also known, in which mobile measuring instruments are installed on board fixed structures, so that their relative position can be varied on the basis of the dimensions of the vehicle to be measured. For example, in the above mentioned application for European patent EP895056, the measuring instruments are slidingly installed on board a vehicle-lifting platform.

U.S. Pat. No. 6,456,372 discloses a device that determines, along a vehicle assembly line, the orientation of the steerable wheels with respect to the non steerable wheels of a motor vehicle by means of a plurality of cameras mounted on movable. Units that may follow a path defined by a horizontal rail that allows movement of the measuring devices only along one direction. The steerable wheels are thus set in a straight ahead position for connection of a steering wheel. Laser devices measure the relative angles of the front and rear wheel hubs as the vehicle is carried along the assembly line.

WO 2006/052684 discloses rails for making the path for a measuring unit having at least two cameras that are able to visualize the bottom of the vehicle. In such device there is also a horizontal cross member fixed to the upper ends of two vertical support members that carries, along a mono-dimensional travel path, a front-end measuring unit. The cameras on this unit may pivot along a horizontal axis. Combination of the measurement taken by such device with the help of suitable target may allow an operator to determine the deformation of the frame of the car due to an accident in order to decide for appropriate repair procedure.

U.S. Pat. No. 6,072,433 discloses a system and method using a plurality of sending and receiving antennas for determining the alignment in space of a formation of moving objects, such has spacecrafts or artificial satellites.

The solutions which are in use at present and are briefly illustrated above are however not free of drawbacks.

In particular, fixed and semi-fixed structures have the drawback of being bulky, and inside the workshop require a relatively large area to be dedicated exclusively to adjusting vehicle attitude.

Mobile structures on the other hand have the drawback that before performing measurements they must be appropriately positioned around the vehicle by the operator, with possible positioning errors and increased working times, and must also be stored away when operations are finished.

DISCLOSURE OF INVENTION

The aim of the present invention is to obviate the above-mentioned drawbacks in the prior art, in the ambit of a simple, rational and relatively economical solution.

This aim is achieved by the characteristics of the invention reported in the independent claims. The dependent claims delineate preferred and/or particularly advantageous aspects of the invention.

In particular the invention provides a device for checking the attitude of a vehicle, comprising at least one measuring instrument which measures at least one characteristic parameter of attitude, in which the measuring instrument is installed on board a self-propelled unit which moves autonomously on the ground, in such a way as to move along variable trajectories.

Thanks to this solution, the measuring instruments on board the relative self-propelled units occupy the measuring area in the workshop only when measuring operations are actually being performed on the vehicle.

Further, subsequent to an appropriate start-operations order, the measuring instruments can move autonomously in search of the vehicle in the measuring area, positioning themselves appropriately relative to the wheels of the vehicle before performing the measurement, after which, at the end of operations they can autonomously return to the initial position, without operator intervention.

This significantly reduces the time required for checking and adjusting the attitude of vehicles. Further, the measuring instruments are prevented from remaining, for whatever reason, for example the operator's forgetfulness, in the measuring area after measuring operations have been completed, where they would be exposed to possible damage in the case of accidental knocks.

The invention further provides a corresponding method for checking the attitude of a vehicle, which includes installing at least one measuring instrument on board a self-propelled unit to measure at least one characteristic parameter of the attitude of the vehicle, which self-propelled unit can move autonomously on the ground in such a way as to follow variable trajectories, and piloting by means of an automatic driving system the movements of the self-propelled unit, thus positioning the measuring instrument in at least one working position relative to the vehicle to be measured.

BRIEF DESCRIPTION OF THE DRAWINGS

Further characteristics and advantages of the invention will emerge, with the aid of the appended figures of the drawings, from the description below, which is provided as a non-limiting example.

BEST MODE FOR CARRYING OUT THE INVENTION

Figure 1:
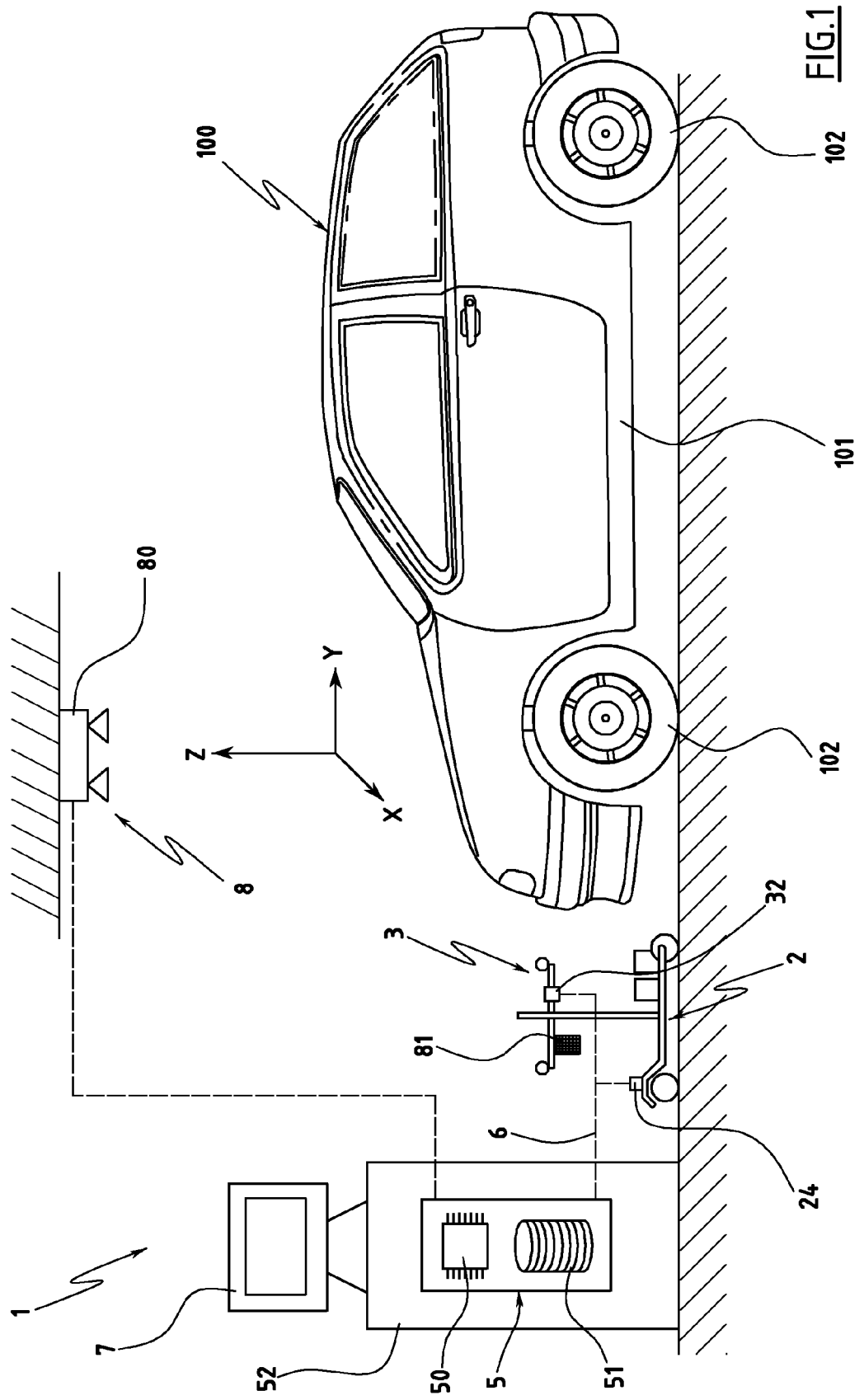
FIG. 1 is a schematic view of an aligning device according to the invention.
Figure 2:
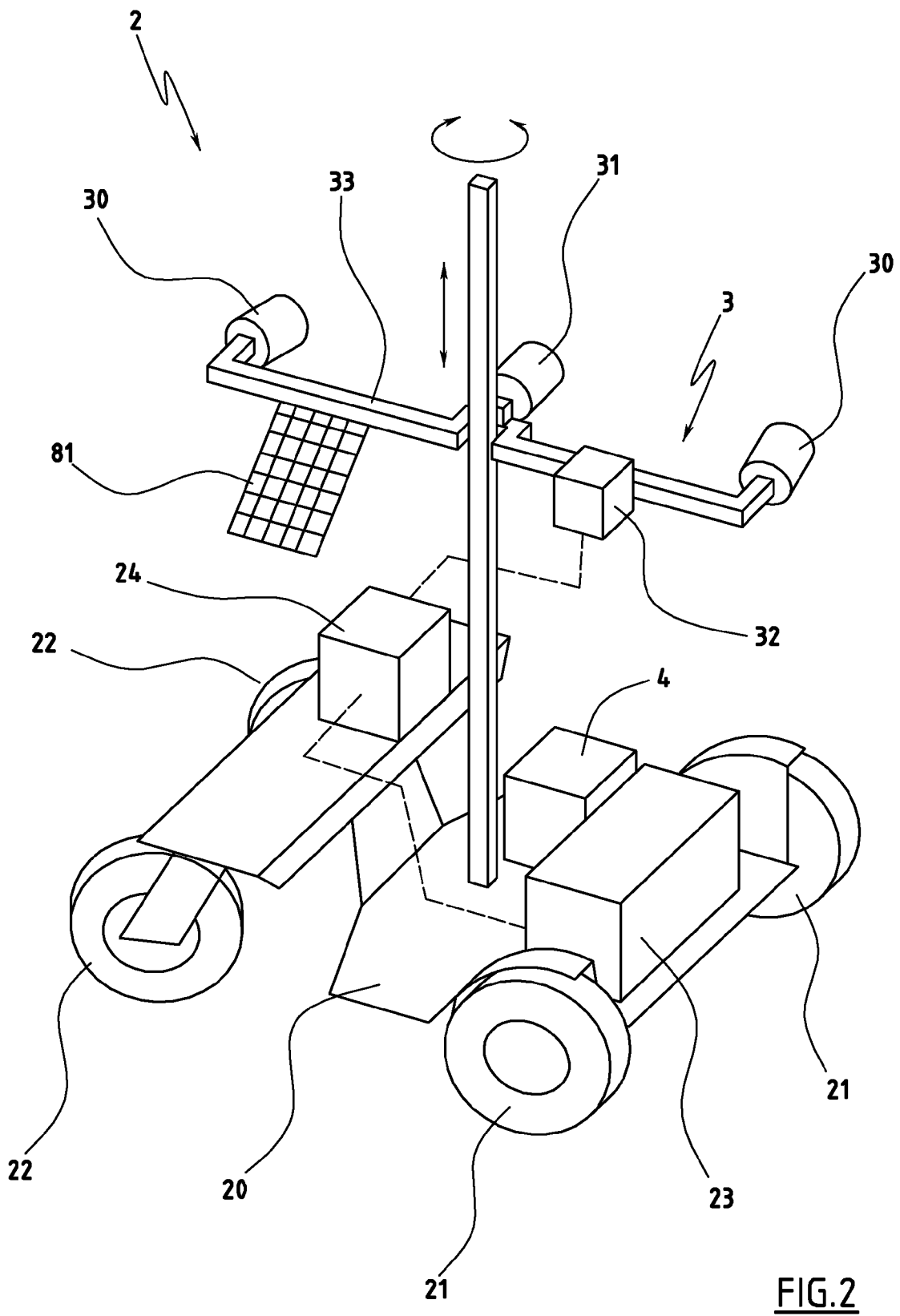
FIG. 2 is a schematic perspective view of a self-propelled unit of the device of FIG. 1.

The accompanying figures of the drawings show an aligning device 1 for adjusting the attitude of a self-propelled vehicle 100, for example a motor car, a truck or the like.

The vehicle 100 schematically comprises a frame 101 to which four wheels 102 are associated, the front wheels being steered wheels.

The aligning device 1 comprises four self-propelled units 2 which can move autonomously on the ground, for example on a floor of a workshop, and are able to travel along variable trajectories in all directions of the plane XY.

Preferably, the self-propelled units 2 can move straight and can curve, but can also rotate around a vertical axis thereof while remaining substantially immobile in a same position on the floor.

In the illustrated example, each self-propelled unit 2 comprises a frame 20 provided with four wheels resting on the floor, of which a pair of front wheels 21 with a fixed axis of rotation, and a pair of rear wheels 22 which pivot as a pair around a vertical axis located centrally between the pair of rear wheels 22. The front wheels 21 are associated to an electric drive motor 23, while the rear wheels 22 are associated to a steering system, which is not shown since it is of a usual type. The electric drive motor 23 and the steering system are both installed on board the frame 20, where they are connected to an electronic control unit 24, which guides the movements of the self-propelled unit 2 in all possible directions on the floor.

Obviously, the self-propelled units 2 could exhibit a completely different constructional form from the one described above, without thereby abandoning the ambit of this invention. For example, each of them could have a different number of driven and/or steered wheels, which further could be arranged on the chassis in different configurations, for example in order to obtain greater precision with certain movements as compared with others, according to particular project specifications.

On board every self-propelled unit 2 a measuring instrument is installed, which is indicated in its entirety by reference number 3, and which measures the geometric data of the wheels 102 of the vehicle 100 directly, on which data the characteristic attitude parameters depend.

The measuring instrument 3 is associated to a guide column 25 of the self-propelled unit 2, on which guide column 25 it is slidingly mobile in a vertical direction, thus varying its height relative to the floor. This vertical movement of the measuring instrument 3 is obtained using usual drive means (not shown) which are directly controlled by the electronic control unit 24.

The guide column 25 is in turn rotatingly installed on the frame 20 of the self-propelled unit 2, in such a way as to rotate about itself and at the same time make the measuring instrument 3 rotate about a vertical axis. The rotation of the guide column 25 is obtained by using usual drive means (not shown) which are also directly controlled by the electronic control unit 24.

If required, the measuring instrument 3 could be provided with further degrees of liberty on board the self-propelled unit 2, and in particular could also move in a horizontal direction, so as to be positionable with greater precision than is possible using only the movements of the self-propelled unit 2 on the floor.

According to the present invention, the measuring instrument 3 can be of any known type, but is preferably of a type which measures the above-mentioned geometrical data of the wheel 102 without direct physical contact with the wheel 102.

In the embodiment shown, the measuring instrument 3 comprises a pair of video cameras 30 in a stereoscopic configuration, that is, distanced from one another is such a way as to be able to view a wheel 102 of the vehicle 100 from different angles, a projector 31 of laser or structured light, and an electronic unit 32 for processing the images viewed by the video cameras 30. In particular, the video cameras 30 are both positioned at the same height from the floor, and are constrained to the ends of a horizontal support cross-bar 33, which is centrally coupled to the guide column 25 of the self-propelled unit 2. The light projector 31 is installed at the centre of the support cross-bar 33, and projects two reciprocally parallel beams of light onto the external lateral wall of the wheel 102 which cut the wheel diametrically, thus giving rise to four angularly equidistanced luminous trace marks on the side of the tyre.

The video cameras 30 can be black and white or colour cameras, and use either CCD (charge-coupled device) or CMOS (complementary metal-oxide semiconductor) sensors. The video cameras 30 are calibrated using known techniques which are at present used widely in the sector and are considered reliable.

The video cameras 30 can be provided with a fixed optical system, or with a variable optical system which adjusts one or more optical characteristics of the images, such as for example the field of vision, zoom, focus, focal length, the position of the optical axis, the aperture of the lenses, or the depth of field.

In particular, the variable optical system can comprise a system of mobile lenses which are moved by appropriate mechanical actuators, or it can comprise a modern system of "fluid lenses", which are characterised by using the interface zone between two immiscible fluids as a lens to focus light. One of these fluids is typically an electrically-conducting aqueous solution, while the other fluid is an electrically non-conducting oil. The fluids are contained in a tube having transparent ends. The lateral wall of the tube and one of its two ends are internally coated with a hydrophobic coating, which repels the aqueous solution, so that a hemispherical mass of fluid forms at the opposite end of the tube. The curved interface surface which forms between the aqueous solution and the oil focuses the light, in the same way that a spherical lens would.

The shape of the fluid lens can be adjusted by applying an electric field along the hydrophobic coating of the tube, so as to induce a variation in surface tension of the fluid. As a result of this surface tension variation, the aqueous solution tends to wet the lateral surface of the tube, thus modifying the radius of curvature of the interface surface between the two fluids, and thereby the focal length of the lens. By increasing the applied electrical field, the initially convex interface surface can be made completely flat or even concave, thus transforming the fluid lens in a controlled way from a converging lens into a diverging lens and vice versa. An example of fluid lens has been developed by the Philips Research Laboratories in Eindhoven in the Netherlands. By assembling two or more fluid lenses along a shared optical axis, and controlling each lens independently of the others, it is possible to obtain numerous optical effects, among which a zoom capability similar to that of traditional optical systems using mobile lenses.

Note that choosing to mount two video cameras 30 in a stereo configuration is justified by the possibility of extracting from the images thus acquired harder and more reliable information for measuring the geometrical data of the wheel 102. This however does not exclude providing the measuring instrument 3 with only one video camera 30, or alternatively with three of more video cameras 30, according to the degree of precision required from the measuring instrument 3. Similarly, the measuring instrument 3 could be provided with a plurality of projectors 31, which could in turn project more complex and appropriately coded luminous patterns.

The measuring instrument 3 is preferably powered by a rechargeable battery 4 which is installed on board the self-propelled unit 2, which battery 4 also powers the electric motor 23, the electronic control unit 24 and all the other electrically-powered functions associated to the self-propelled unit 2.

The aligning device 1 comprises a central processing unit 5, for example a personal computer, which is housed inside a cabinet 52 which is arranged in a fixed position inside the workshop, and generally comprises at least one processor 50 to which at least one mass memory unit 51 is associated.

In the mass memory unit 51 databases containing useful information about the vehicles are stored, in particular the correct values for the characteristic attitude values for each type and model of vehicle which the aligning device 1 can handle.

As a non-limiting example, the characteristic parameters of attitude may include the following: left, right and total front convergence; left, right and total rear convergence; left and right front camber; left and right rear camber; left and right incidence; right and left kingpin; front and rear set-back; thrust angle; front track; rear track; right side wheelbase, left side wheelbase; track difference.

The central processing unit 5 communicates with the electronic control unit 24 of all the self-propelled units 2 of the aligning device 1, and with the processing unit 32 of the measuring instruments 3 which are installed on the self-propelled units 2.

Preferably, communication is obtained by means of a communication system 6 which allows wireless data transmission, for example via radio or infrared light.

In a possible alternative version of the invention, the processing unit 32 of each measuring instrument 3 could be connected to, or directly integrated into, the electronic control unit 24 of the relative self-propelled unit 2. In this case, the central processing unit 5 could be connected only to the electronic control unit 24.

The central processing unit 5 is also connected to a display 7, and possibly also to a printer (not shown), such as to provide the operators with the results of processing which is performed.

The aligning device 1 further comprises spatial location means, which constantly monitor the position and orientation of the measuring instruments 3 within an operating space A where measuring operations take place.

In the illustrated example, the spatial location means comprise a single opto-electronic sensor 8, comprising for example a video camera or a pair of video cameras in a stereo configuration, which sensor 8 is connected to a central processing unit 5 and mounted in a zone of the operating space A, for example on the ceiling of the workshop, from where it can view all the measuring instruments 3 mounted on the self-propelled units 2.

The opto-electronic sensor 8 is associated to a respective electronic processing unit 80, which in the images viewed by the video cameras detects the position and orientation of appropriate coded targets 81, each of which is installed on a respective measuring instrument 3.

The information thus detected is transmitted to the central processing unit 5 which by means of known mathematical-geometric algorithms calculates the spatial coordinates of each of the targets 81, and thus of each measuring instrument 3, in a fixed XYZ frame of reference in the operating space A.

In the context of this invention, the spatial location means described above can be replaced by alternative systems which use different localising techniques, and can be borrowed from other technical sectors, such as for example the sector of robotics and industrial automation.

Purely by way of example, location means which make use of radio synchronisation could be used. For example, on each measuring instrument 3 a receiver could be installed which receives radio signals emitted by a relative transmitter which is arranged in a fixed position in the operating space A.

The receiver could comprise a pair of highly directional aerials provided with uniform circular motion, and a processing unit which precisely calculates the position of the transmitter relative to a frame of reference which solidly place on the measuring instrument 3. The data collected could then be transmitted to the central processing unit 5, which on the basis of the known position of the radio transmitter, could easily calculate the exact coordinates of the measuring instrument 3 in the operating space A.

A further alternative could be to mount on each measuring instrument 3, gyroscopes and acceleration/inclination gauges which communicate with the central processing unit 5. In this way, starting from a precisely-known position of the measuring instruments 3, the central processing units 5 can integrate the signal provided by the gyroscopes during the displacements of the measuring instrument 3, thus determining the translational vector relative to the initial position. The rotation of the measuring instrument 3 can be similarly obtained from the variations of the angles measured by the inclination meters.

Naturally the integrations of signals supplied by the gyroscopes and by the acceleration/inclination meters could be performed directly by the electronic unit 32 which is mounted on board each self-propelled unit 2.

Independently of which spatial location means are chosen, it is preferable to delimit appropriately the operating space A in which the self-propelled units 2 with the relative measuring instruments 3 can move autonomously, so as to improve the reliability of the system. This delimitation can be obtained by installing on each self-propelled unit 2 an optical sensor (not shown) which identifies perimeter markers which delimit the operating space A, in such as a way that the self-propelled units do not cross the limit. These perimeter markers can be appropriate adhesive markers applied to the floor, or laser light beams which are parallel to the floor and situated at heights which the optical sensors of the self-propelled units 2 can identify.

In a variant, the perimeter markers could be magnetic bodies which are directly inserted in, or applied to, the floor to delimit the operating space A. In this case, a magnetic sensor would be installed on each self-propelled unit 2 to constantly monitor the position of these magnetic bodies, thus controlling the movements of the self-propelled unit 2 so that it does not go beyond the predetermined perimeter.

Alternatively, since the central processing unit 5 constantly knows the position in space of the measuring instruments 3, the central processing unit 5 itself can delimit the operating space A and prevent the self-propelled units 2 from leaving the operating space A.

Figure 3:
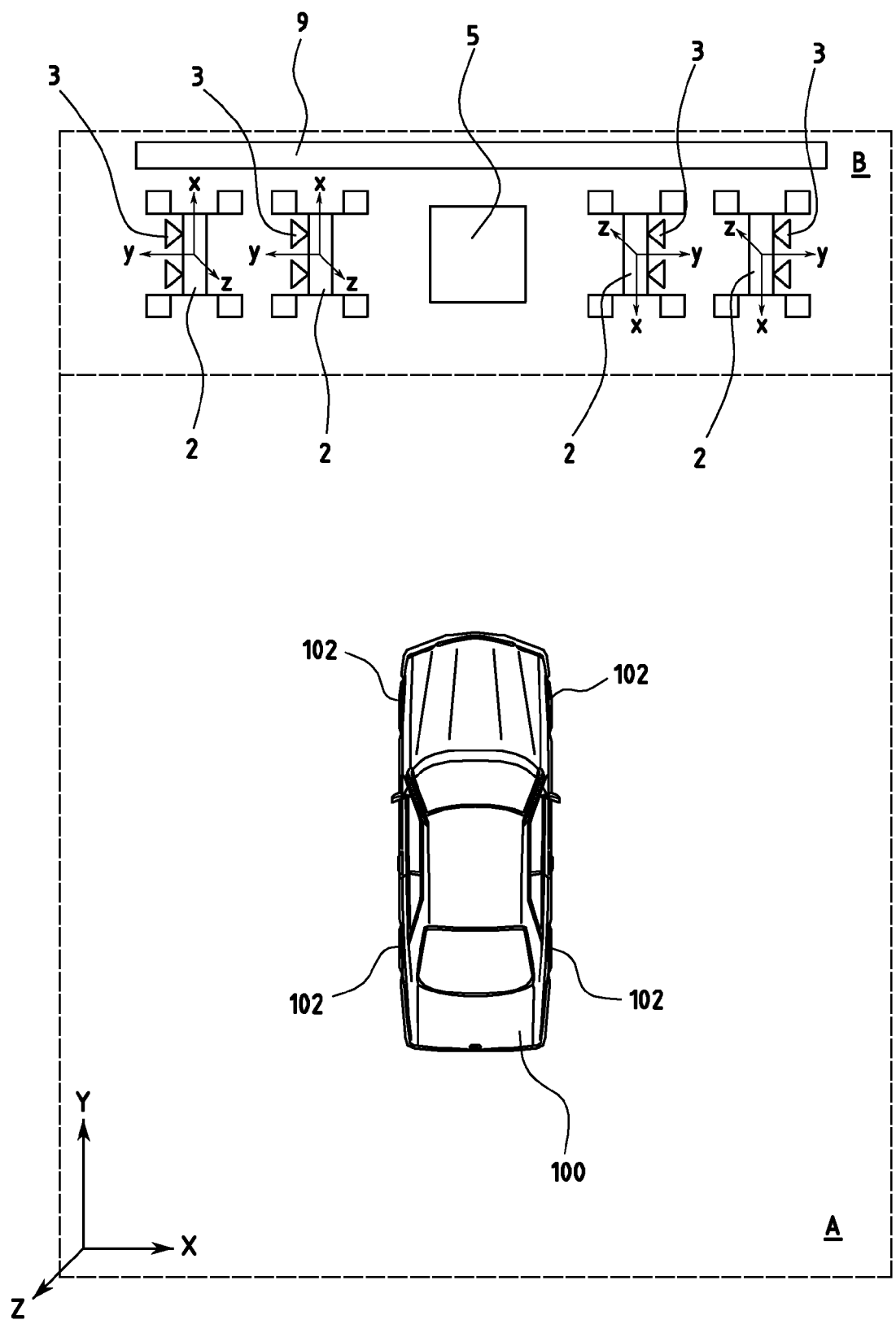
FIGS. 3 and 4 are two views from above of the device of FIG. 1, which is shown at two different moments during operation.

As shown in FIG. 3, the aligning device 1 further comprises a recharger station 9 for the power batteries 4 of the self-propelled units 2, which station is arranged inside a predetermined parking area B where the self-propelled units 2 are parked when not required to perform measuring operations.

Preferably, the parking area B provided near the central processing unit 5, and the recharger station 9 generically comprises connection means which connect the power batteries 4 of the self-propelled units to an electric mains supply. The batteries 4 can either be charged whenever the self-propelled units 2 are inside the parking area, or only whenever the charge level falls below a predetermined charge threshold level.

To use the aligning device 1, the vehicle 100 to be checked is halted in the operating area A, near the central processing unit 5 and near the self-propelled units 2 which are parked in the parking area B.

Figure 4:
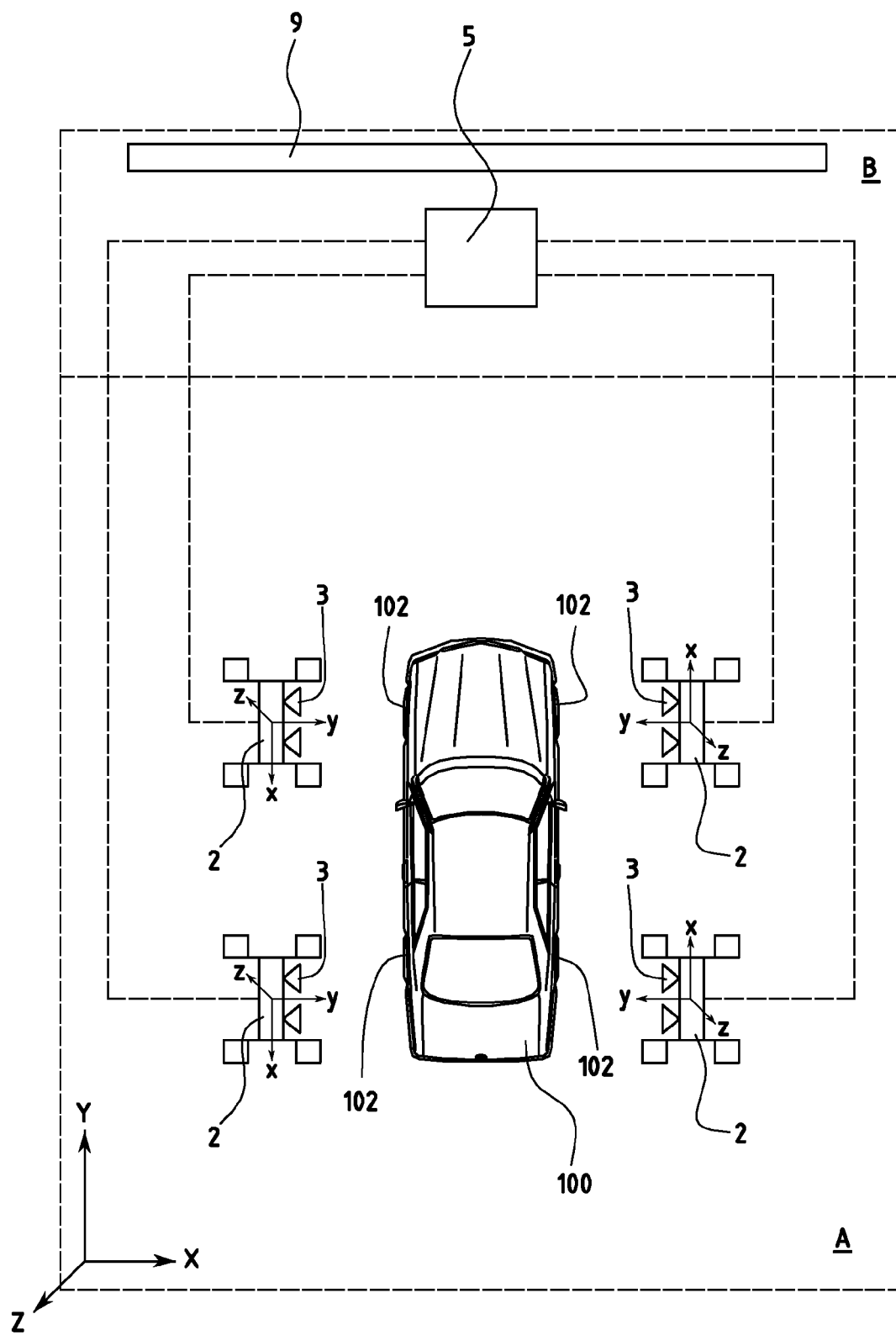

When the central processing unit 5 receives the appropriate start-operations signal, for example via a remote control device or any other activation organ operated by the operator, the self-propelled units 2 start to move autonomously on the floor in the zone surrounding the vehicle 100, so as to position each measuring instrument 3 in a predetermined working position relative to a respective wheel 102 of the vehicle 100 (see FIG. 4).

The working position generally depends on the type of measuring instrument 3 which is installed on the self-propelled units 2, and on the detection system which it uses.

As regards the measuring instruments 3 described here, the working position entails for example the video cameras 30 being positioned at substantially a same height as the axis of rotation of the wheel 102, arranged on opposite sides, and equidistant from the axis of rotation, and reciprocally aligned along a direction which is parallel to the side of the wheel 102, in such a way that the projector 31 is substantially aligned with the centre of the wheel 102.

Obviously this positioning of the measuring instruments 3 can be obtained not only through the movements of the self-propelled units 2 on the floor, but also thanks to the vertical movements and rotation of the measuring instruments 3 on board the relative self-propelled units 2.

In particular, each measuring instrument 3 is preferably guided from the rest position to the working position relative to the vehicle 100 in two successive phases, an initial positioning phase of the self-propelled unit 2, and a subsequent fine positioning phase of the measuring instrument 3 leading to the definitive working position.

The initial positioning phase can be performed in a variety of different modalities.

In one of these modalities, the vehicle 100 to be checked is first of all halted in a predetermined parked position in the operating space A, for example on a vehicle lift.

When the start-operations signal is given, the central processing unit 5 orders each self-propelled unit 2 to follow a predetermined trajectory, which is the same for all types and models of vehicle, in order to halt the self-propelled unit 2 substantially in front of a respective wheel 102, at an intermediate position from which it is supposed that both video cameras 30 of the measuring instrument 3 can view the wheel (see FIGS. 3 and 4 as an example). The trajectories imposed on each self-propelled unit 2 can be stored in the central processing unit 5 during installation of the aligning device 1, and can if required be modified by reprogramming the central unit 5. Alternatively, the trajectory of each self-propelled unit 2 could be stored directly in the relative electronic unit 32, and thus be modified by reprogramming the electronic unit 32.

As an alternative, the above-mentioned trajectories could be traced directly on the floor, for example using light projectors or physical markers, which optical guide systems installed on the self-propelled units 2 could follow.

In an alternative modality for performing the initial positioning phase, the operator indicates to the central processing unit 5, for example via a keyboard or by selecting, on a monitor, the model of vehicle 100 which is in the halted position, such that from the data base in its memory the central unit 5 can obtain the dimensions of the vehicle 100 and the relative position of the wheels 102, for example the wheelbase and the track.

Based on knowing the halted position of the vehicle 100 in the operating space A, and the relative positions of the wheels 102, the central unit 5 commands the self-propelled units 2 to follow trajectories which vary according to the model of the vehicle 100, such as to position each self-propelled unit 2 in front of a respective wheel 102 with greater precision, in an intermediate position from which both video cameras 30 of the measuring instrument 3 can view the assigned wheel 102.

In a possible variant of this solution, the vehicle 100 can be recognised automatically, for example by means of an auxiliary video camera which reads the registration plate of the vehicle 100. The image viewed in this way is transmitted to the central processing unit 5, which reads the registration plate, using it as a search parameter in its data base. In this case, recognition of the vehicle 100 would permit access not only to information about the model of the vehicle 100, but also to more detailed information relative to the specific vehicle 100 being analysed, for example measurements and/or previous adjustments which had been performed and were stored in the central processing unit 5.

If upon conclusion of the initial positioning phase, the video cameras 30 of the measuring instrument 3 cannot view the wheel 102, an emergency procedure can be implemented whereby the self-propelled unit 2 and/or the measuring instrument 3 on board the self-propelled unit 2 are ordered to move, thus moving the video cameras 30 in an attempt to view the wheel 102 of the vehicle.

Emergency moving can follow a predetermined logic: for example moving the self-propelled unit 2 along a predetermined direction for a predetermined distance, whereupon if the wheel 102 cannot be viewed, changing the height of the measuring instrument 3 from the floor, and reversing the self-propelled unit 2 along the previous direction.

Alternatively, emergency moving can follow a semi-random procedure. In this case, appropriate strategies are known which optimise the movements, thus preventing the repetition of trajectories which have already been followed.

Finally, emergency movements can be determined by neural networks: starting with a sequence of set trajectories, once the wheel 102 has been framed, the parameters are updated in the neural network, so that the next time the trajectory will be an improvement on the previous one.

Once the self-propelled unit 2 has reached the intermediate position from which both video cameras 30 of the relative measuring instrument 3 frame the assigned wheel 102, the fine positioning phase for reaching the actual working position starts.

In the fine positioning phase, first of all the spatial position of the wheel 102 is determined in a local XYZ frame of reference of the measuring instrument 3.

To obtain this information, the electronic unit 32 of the measuring instrument 3 acquires and processes two images of the wheel 102 which are viewed from different angles, respectively by each of the video cameras 30.

In particular, the electronic unit 32 identifies a same characteristic line of the wheel 102 in each of the images, preferably the border separating the rim and the tyre, or the outer edge of the wheel, and estimates the equation of this characteristic line in the two-dimensional images.

Since in reality the lines are circular, their equation will generally be the equation of an ellipse.

To perform this processing, in the electronic unit 32 algorithms can be implemented which use edge-detection techniques, or algorithms which use techniques such as for example the Hough transform or Active Contouring to identify circular or elliptical shapes in the images.

Based on the equations of the characteristic line of the wheel 102, which are determined in the two 2D images using known triangulation algorithms, the electronic unit 32 performs a 3D reconstruction which makes it possible to estimate the position of the plane and/or of the axis of rotation of the wheel 102 and the dimensions of the detected characteristic line, relative to the local XYZ frame of reference of the measuring instrument 3.

At this point, the electronic unit 32 guides the movements of the self-propelled unit 2 on the floor and/or of the measuring instrument 3 on board the self-propelled unit 2, repeating the previous phases until the position, angle and dimensions of the wheel 102 in the local XYZ frame of reference assume predetermined values, which correspond to the measuring instrument 3 achieving the working position.

Note that if the video cameras 30 of the measuring device 3 are provided with variable optical systems, these systems can be maintained in the maximum visual field configuration during the initial and fine positioning phases, such as to provide greater possibilities for correctly viewing the wheel 102.

Figure 5:
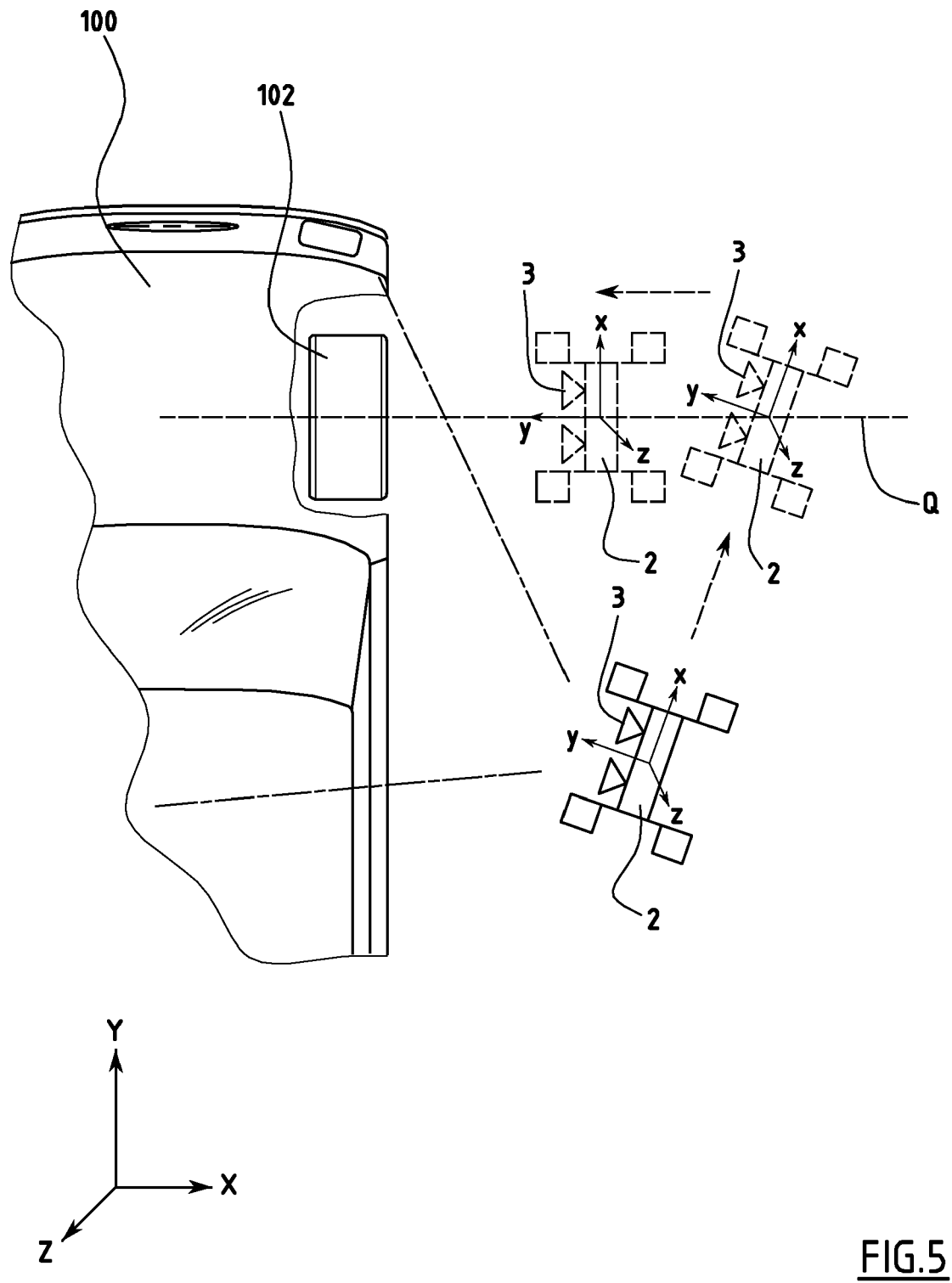
FIG. 5 is a detail showing the fine positioning phase of the measuring instrument.

With the aid of FIG. 5, an example of a fine positioning operation for a measuring instrument 3 is described, the local frame of reference of which has its origin in the median point between the two video cameras 30.

Initially, the self-propelled unit 2 is in the intermediate position, which is reached after the rough positioning phase (indicated by a continuous line), in which position the wheel 102 is framed by the video cameras 30 of the measuring instrument 3. Using the image processing techniques described above, the electronic unit 32 identifies the edge of the wheel or the border between the rim and the tyre, estimating the position of the wheel 102 relative to the XYZ frame of reference of the video cameras 30.

While continuing to monitor the relative position of the axis Q of the wheel 102, the electronic unit 32 guides the self-propelled unit 2 to move in a straight line, until the axis of the wheel 102 is near the origin of the local XYZ frame of reference of the measuring instrument 3; it then orders the self-propelled unit 2 to rotate about a vertical axis, such as to align the video cameras 30 parallel to the side of the wheel 102; and if necessary it orders the measuring instrument 3 to rise relative to the self-propelled unit 2, so as to situate the video cameras 30 at the same height as the axis of the wheel 102.

At this point, while continuing to monitor the diameter of the edge of the wheel or of the border between the rim and the tyre in the images, the electronic unit 42 guides the self-propelled unit 2 to move closer to the wheel 102, up until when the diameter is equal to a predetermined value which corresponds to optimal viewing of the wheel 102 by the video cameras 30.

Figure 6:
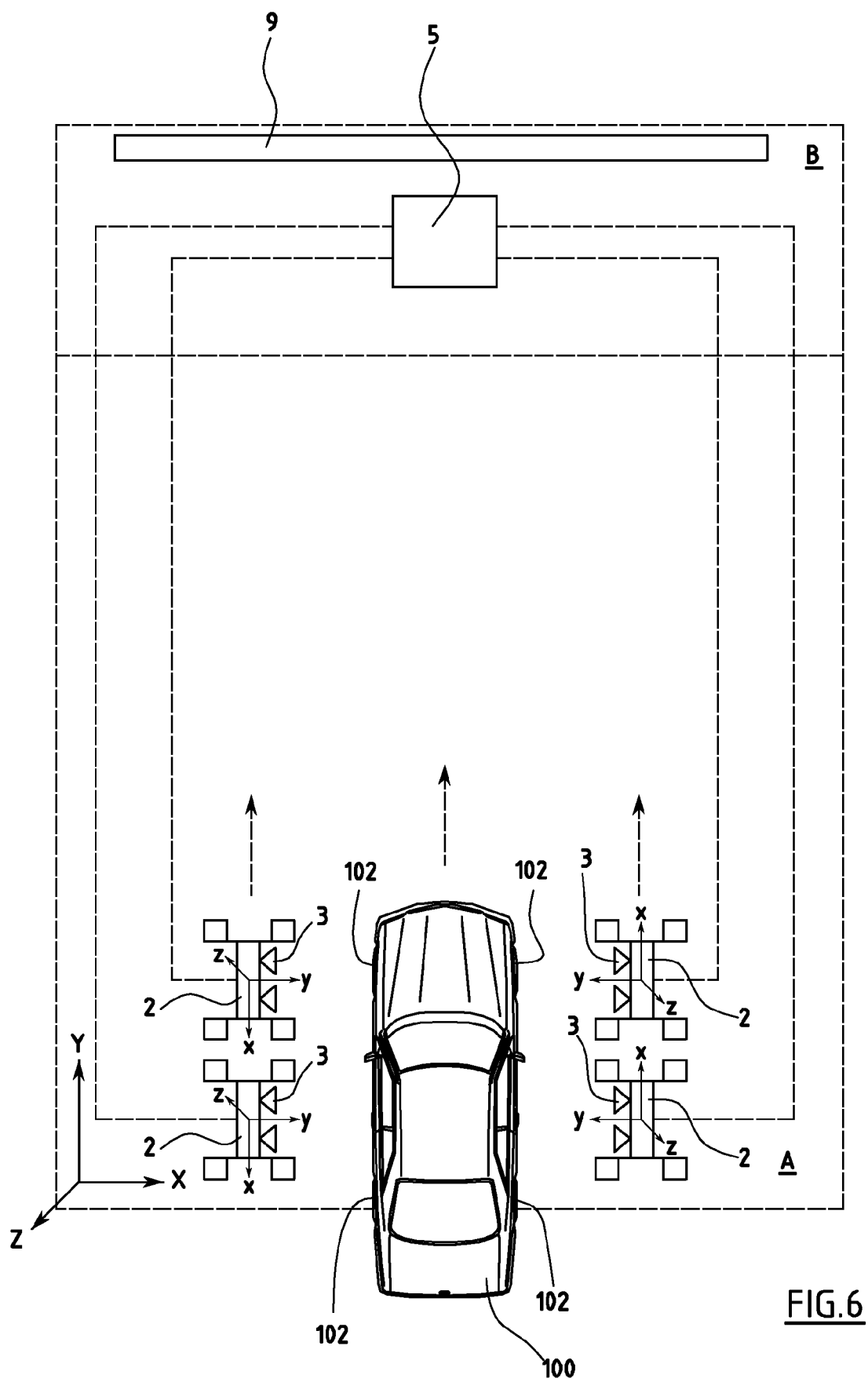
FIGS. 6, 7 and 8 show three alternatives for the positioning phase of the self-propelled units.

An alternative modality for positioning the measuring instruments 3 is described below, with the aid of FIG. 6.

In this modality, in the initial positioning phase, when the start-operations order is given, the central processing unit 5 orders the self-propelled units 2 to move to predetermined positions in the operating space A, near which the vehicle A to be checked is made to pass. In the example shown, the self-propelled units 2 are arranged in pairs, one facing the other, thus defining a corridor through which the vehicle 100 is made to pass; the video cameras 30 of the relative measuring instruments 3 face towards the inside of the corridor.

While the measuring instruments 3 are immobile in this predetermined intermediate position, the vehicle 100 is made to transit within the corridor without stopping.

When the front wheels of the vehicle 100 enter the field of view of the video cameras 30 on the self-propelled units 2, which are arranged downstream relative to the direction of advancement of the vehicle 100, the fine positioning phase of the relative measuring instruments commences. In practical terms, by means of the above-mentioned image processing techniques, the electronic units 32 of the measuring instruments 3 monitor the relative position of the wheels 102 as the vehicle 100 advances, and order the relative self-propelled units 2 to follow the wheels 102, until the working position is reached.

The fine positioning phase is implemented by the measuring instruments 3 installed on the self-propelled units 2, which are arranged upstream relative to the direction of advancement of the vehicle 100, when the rear wheels of the vehicle enter the field of view of the relative video cameras 30.

Note that in the positioning modality described above, the measuring instruments 3 can reach the working position by moving together with the vehicle 100, so that some or all of the phases of measuring the wheels 102 which will be described below can take place with the vehicle 100 moving.

When all the measuring instruments 3 are immobile in working position, each instrument 3 directly measures the geometric values of the wheels 102 assigned to it, and upon which the characteristic attitude parameters depend.

First of all, the projector 31 projects the diametral beams of light onto the wheel 102 so as to obtain the four luminous marks on the side of the tyre. The video cameras view the images of the wheel 102 with the luminous marks and transmit the images to the processing unit 32. If the video cameras 30 are provided with variable optical systems, before performing this image capture, some optical features of the images can be adjusted, such as for example focus and zoom, in order to make the measurements more precise.

To prevent any reflections of light on the rim of the wheel 102 from giving rise to measurement errors, the images which the video cameras view 30 are initially processed to recognise the zone corresponding to the border between the rim and the tyre, such as to exclude all internal points from subsequent processing and thus take into consideration only the parts of the laser marks which are to be found on the side of the tyre. Recognition of the border between rim and tyre can be effected for example using edge-detection techniques, or algorithms which utilise techniques which can identify circular or elliptical shapes present in the images, for example using the Hough transform or Active Contouring.

The processing unit 32 then performs a processing algorithm which, using the images and known triangulation techniques, is capable of determining the equation of the plane which is tangent to the laser marks relative to the local XYZ frame of reference which is associated to the measuring instrument 3; the tangent plane substantially coincides with the plane of rotation of the wheel 102. The processing algorithm further makes it possible to find the point, on the tangent plane, which is equidistant from the points of tangency with the tyre, and thus to determine the equation of the axis of rotation of the wheel 102 relative to the local frame of reference of the measuring instrument 3.

Note that to detect the above-mentioned geometric data of the wheel, it would theoretically be sufficient to project only three angularly-distanced luminous marks onto the side of the tyre. However, projecting four angularly-distanced luminous marks makes it possible to make the processing algorithm more detailed and reliable, since otherwise it might provide results that were not completely reliable, especially in cases where there were intense light reflections on the rim.

The geometrical data of the wheels 102 detected by each measuring instrument 3 are then transmitted to the central processing unit 5, which first of all uses known mathematical algorithms to transform the equations of the planes and/or the axes of rotation of the wheels 102 detected in the local XYZ frames of reference of the measuring instruments 3, into the corresponding equations in the overall XYZ frame of reference of the operating space A.

Obviously, to operate these transformations, the central processing unit 5 must at the same time acquire, by means of the spatial location means 8, the position and the precise orientation of all the measuring instruments 3 relative to the overall XYZ frame of reference.

On the basis of this information, the central processing unit 5 then calculates the angles and the other characteristic parameters of the wheels 102, compares them with the correct values in the mass memory 51 relating to the type and model of vehicle 100, and finally calculates the corrections to be made to the characteristic attitude parameters so that their values will fall within the permitted values, displaying the corrections on the monitor 7, and possibly also printing a paper copy.

On the basis of the values provided by the processing unit 5, the attitude adjustment operation is completed by a mechanical aligning phase, in which the operator manually modifies the configuration of the mechanical organs of the vehicle 100 upon which the characteristic parameters of the wheels 102 depend, such as to implement the necessary corrections.

When measuring operations and if required those of mechanical alignment have been completed, the self-propelled units 2 automatically return to the parking area B, for example by reversing back along the trajectory previously followed to reach the working position, which trajectory can have been appropriately stored in the central processing unit 5.

Figure 7:
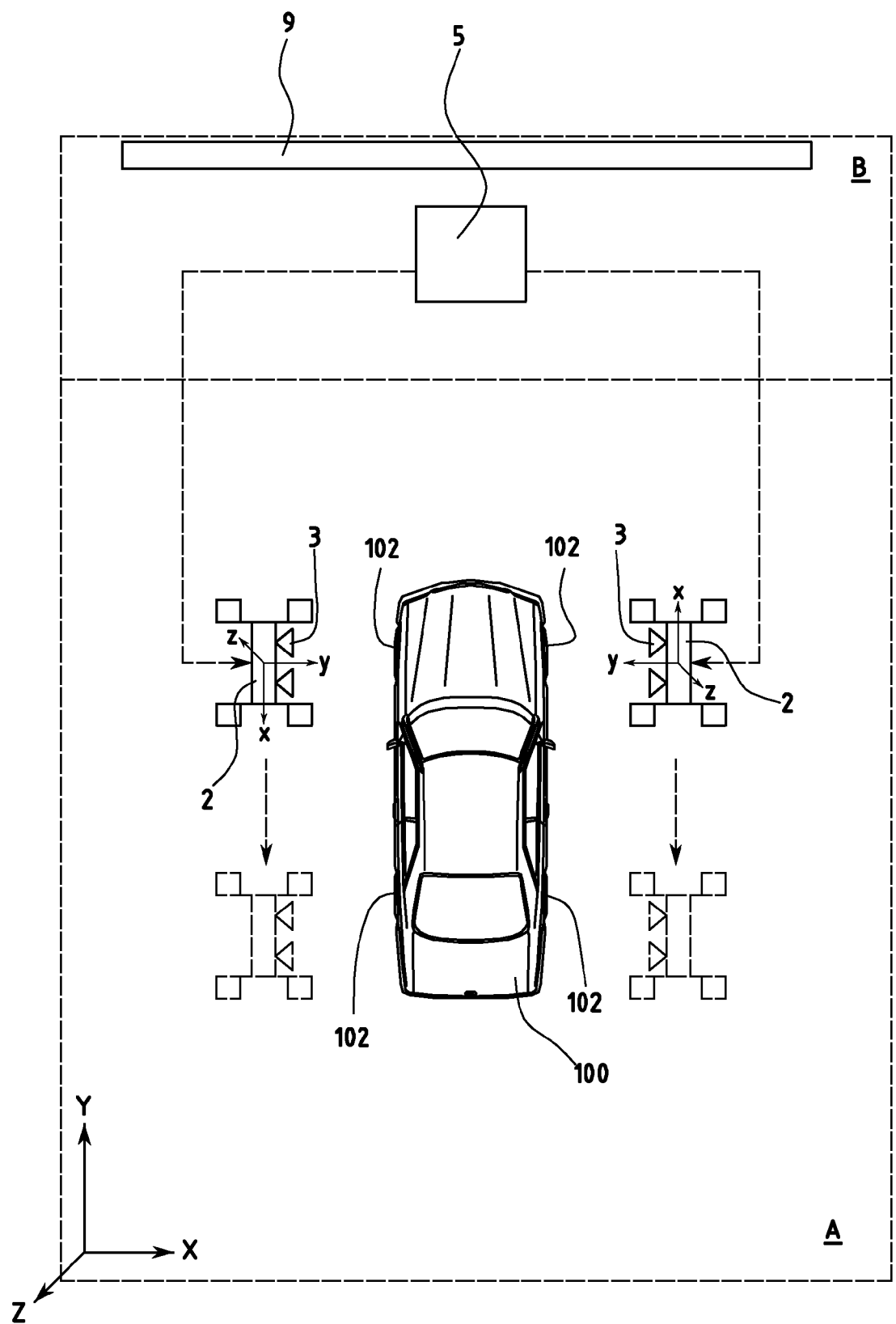
Figure 8:
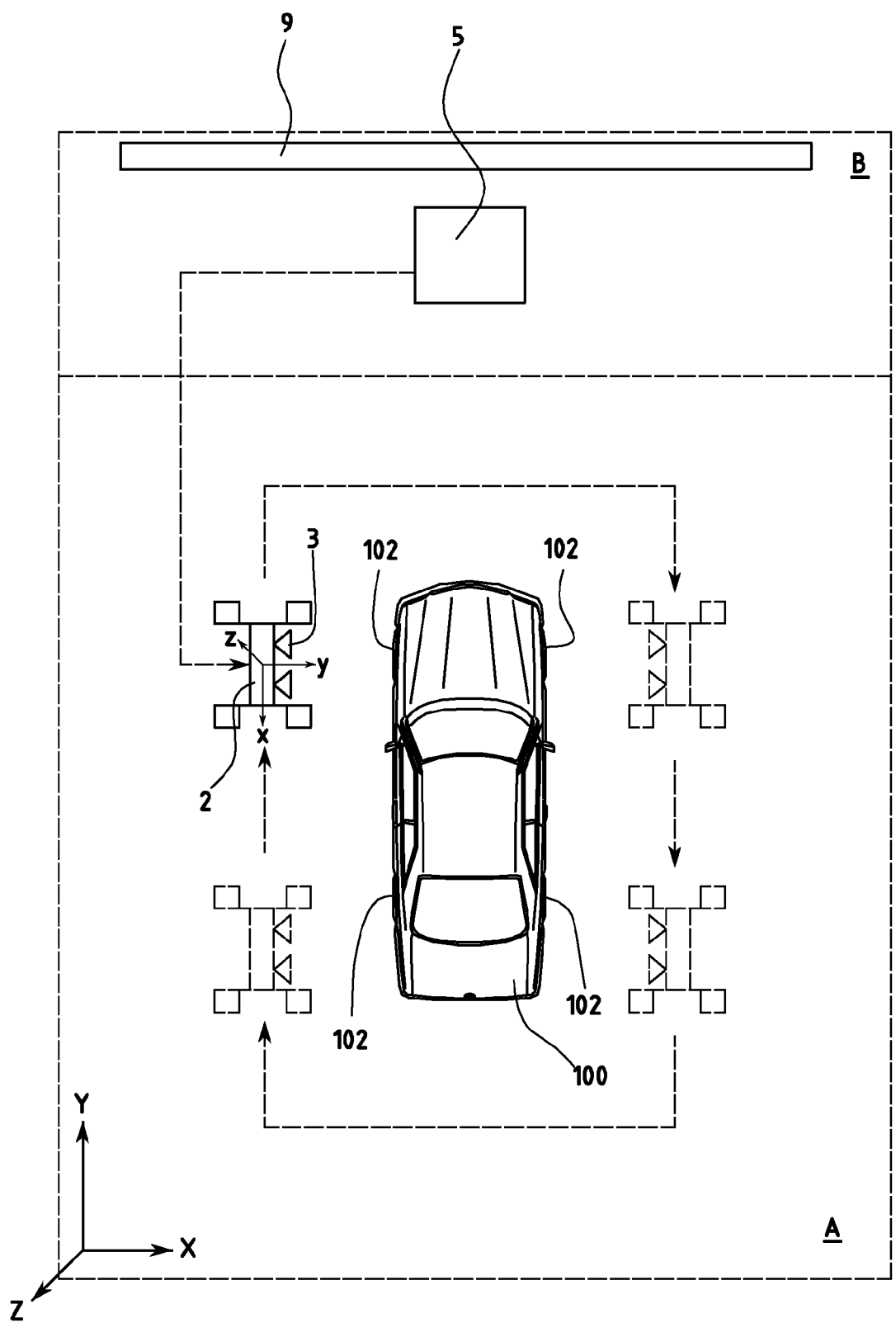

In order to reduce the cost of the aligning device 1 described above, two alternative embodiments are provided, which are shown in FIGS. 7 and 8.

In the first alternative, the aligning device 1 comprises only two self-propelled units 2, each of which is provided with a relative measuring instrument 3. When the start-operations order is given, the two self-propelled units 2 move autonomously on the floor to position the relative measuring instruments 3 in a working position relative to the front wheels of the vehicle 100, where the first measurements are performed. At this point, the self-propelled units 2 move again to reposition the measuring instruments 3 in a working position relative to the rear wheels of the vehicle 100, where the second measurements are performed. The geometric data collected during the first and second measurement operations are transmitted to the central processing unit 5 which calculates the characteristic attitude parameters.

Obviously, the measurements could be first performed on the rear wheels and then on the front wheels, or first on the left wheels and then on the right wheels or vice versa, or else in a crosswise fashion, front-and-back wheel.

In the second alternative, the aligning device 1 comprises only one self-propelled unit 2 which is provided with the relative measuring instrument 3. When the start-operations order is given, the self-propelled unit 2 moves autonomously on the floor, sequentially positioning the measuring instrument 3 in the working position relative to all the wheels of the vehicle 100, where it performs the relative measurements.

The geometric data collected during these measuring operations are transmitted to the central processing unit 5, which calculates the characteristic attitude parameters and any necessary corrections to be effected.

Note that thanks to an aligning device 1 according to any of the embodiments described above, it is advantageously possible for the measuring instruments 3 mounted on the self-propelled units 2 to effect measurements on a plurality of vehicles 100, in sequence and without any interruption, in such a way as to reduce the average testing time drastically. The vehicles 100 to be checked can for example be arranged in a row inside the working area, and the self-propelled units 2 can move the measuring instruments from one vehicle to the next each time a measuring operation on the wheels 102 is completed. These operations can also take place without the direct presence of the operator, for example at night. When all the measurements are completed, the operator needs only to adjust mechanically the attitude of the vehicles 100 which present alignment errors of the wheels 102, thus providing significant time saving.

A further advantage of the solutions provided is that the measurements can be repeated for different steering angles of the front wheels 102 of the vehicle 100, since the movements of the self-propelled units 2 allow the working position of the measuring instruments 3 to be varied automatically according to the orientation of the wheels.

Note in conclusion that as an alternative or in addition to the foregoing description, the measuring instruments 3 can also be configured to measure other characteristic parameters of the attitude of the vehicle 100, for example the height of the frame from the ground or the length of the suspensions.

Similarly to the description above regarding the wheels 102, in this case the self-propelled units 2 will move on the floor, and the measuring instruments will possibly move on board the self-propelled units 2, until the measuring instruments 3 are situated in an appropriate working position relative to the component of the vehicle 100 to be measured, for example relative to the suspensions.

The component of the vehicle to be measured can be predetermined, or chosen from one time to the next according to the specific vehicle 100 being checked.

In the last-mentioned case, the component to be measured is chosen during a preliminary phase.

Figure 9:
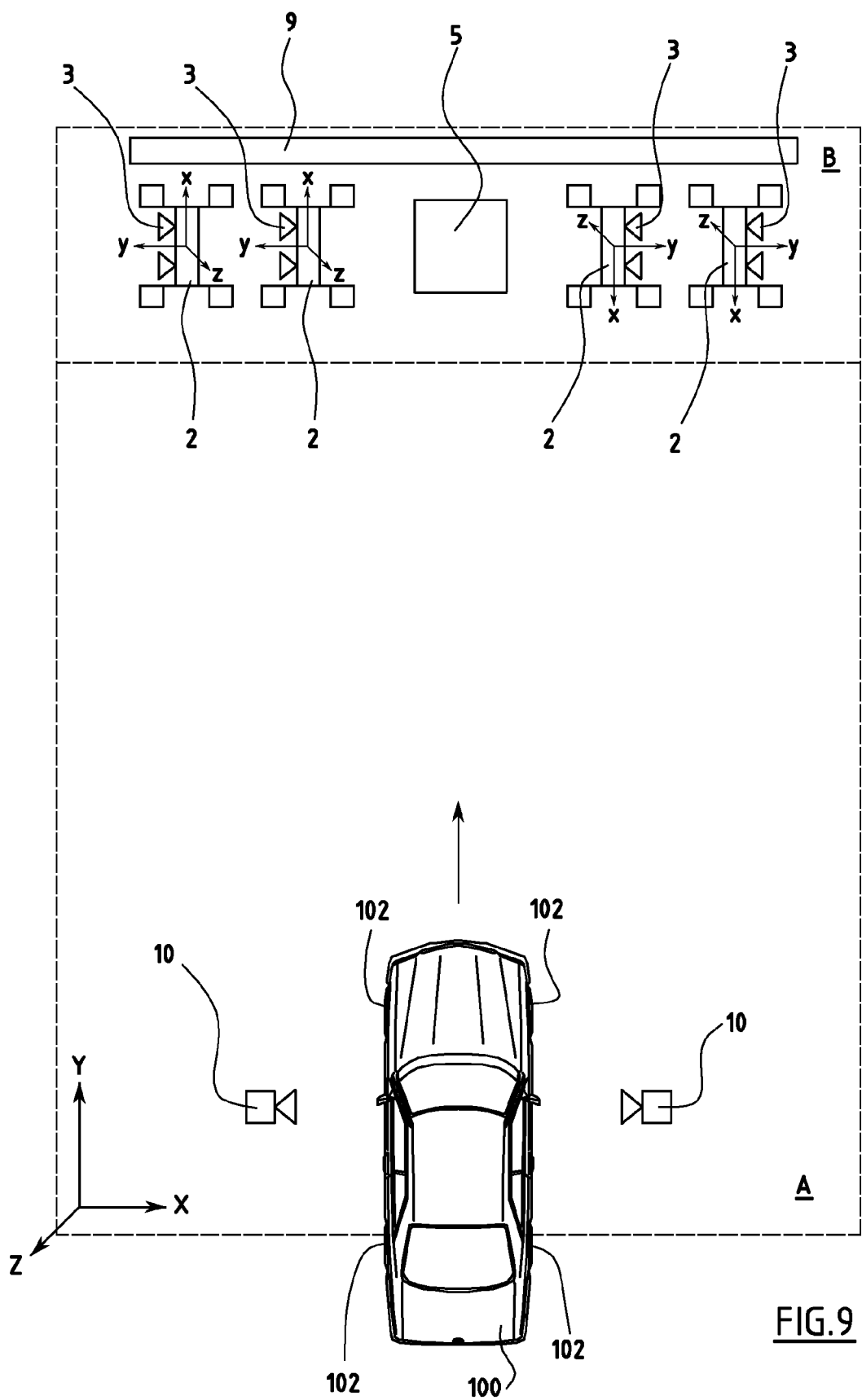
FIG. 9 is a view from above showing the device 1 according to an alternative configuration.

FIG. 9 shows an example of this solution, with reference to a device 1 which is structurally analogous to the device described above for measuring the geometric data of the wheels 102.

The vehicle 100 is positioned in the operating space A, where appropriate sensors, for example pressure sensors, can recognise the presence of the vehicle 100 and order one or more video cameras 10 to acquire images of the portions of the vehicle 100, in which the components to be measured are situated.

The images viewed by the video cameras 10 are transmitted to the central processing unit 5, which allows the operator to select the components to be measured and identifies the selected components in the images.

When the vehicle 100 stops, the central processing unit 5 orders the guide system of the measuring instruments which are arranged on the self-propelled units 2 to move autonomously in search of the components to be measured, until they stop in an appropriate working position relative to the components.

In this case, in addition to moving externally to the vehicle 100, the self-propelled units 2 can possibly also move below its body, in the space between the wheels 102.

Obviously a person skilled in the art will be able to introduce numerous technical and application modifications to the above-described device 1, without thereby forsaking the ambit of the invention as claimed below.

The invention claimed is:

1. A device for checking an attitude of a vehicle (100), provided with wheels (102), comprising at least one measuring instrument (3) for measuring at least one characteristic attitude parameter, said at least one characteristic attitude parameter comprising at least characteristic angles of the wheels (102) of the vehicle (100), said measuring instrument (3) comprising at least one video camera (30) which can capture images of at least a portion of the vehicle (100) to be measured, wherein the measuring instrument (3) is installed on board a self-propelled unit (2) which can move autonomously on the ground, in such a way as to be capable of following variable trajectories, the device further comprising first guiding means associated with the measuring instrument (3) which move the measuring instrument (3) in a vertical direction on board the self-propelled unit (2), thus varying the height of the measuring instrument (3) with respect to the floor, a drive means for vertically moving the measuring instrument (3), an electronic control unit (24) for directly controlling the drive means.

2. The device of claim 1, wherein the measuring instrument (3) performs measurements without making any contact with the vehicle (100) to be measured.

3. The device of claim 1, further comprising a variable optical system associated with the at least one video camera (30).

4. The device of claim 3, wherein the variable optical system comprises fluid lenses.

5. The device of claim 1, wherein the measuring instrument (3) comprises a pair of video cameras (30) which can view images of the portion (102) of the vehicle (100) from different angles.

6. The device of claim 1, wherein the measuring instrument (3) comprises a light projector (31) which projects at least a luminous target beam onto at least one portion (102) of the vehicle (100) to be measured.

7. The device of claim 1, wherein the measuring instrument (3) is associated to second guiding means which make the measuring instrument (3) rotate about an axis of vertical rotation on board the self-propelled unit (2).

8. The device of claim 1, further comprising a plurality of measuring instruments (3), each of which is installed on board a relative self-propelled unit (2).

9. The device of claim 1, further comprising a central processing unit (5) connected to the measuring instrument (3), such as to receive the data relating to the measurements performed on the vehicle (100) from the measuring instrument (3).

10. The device of claim 1, wherein the self-propelled unit (2) is provided with rechargeable batteries (4).

11. The device of claim 10, further comprising a recharging station (9) which recharges the batteries (4) of the self-propelled unit (2).

12. The device of claim 1, further comprising a spatial location system (8) which detects a position of the measuring instrument (3) within an operating space (A).

13. The device of claim 1, further comprising means to prevent the self-propelled unit (2) from leaving a predetermined operating space (A).

14. A method for checking the attitude of a vehicle (100) provided with wheels (102), comprising the following steps:

installing at least one measuring instrument (3) for measuring at least one characteristic attitude parameter of the vehicle (100), said at least one characteristic attitude parameter comprising at least characteristic angles of the wheels (102) of the vehicle (100), on board a self-propelled unit (2), said measuring instrument (3) comprising at least one video camera (30) configured to capture images of at least a portion (102) of the vehicle (100) to be measured, wherein said self-propelled unit (2) can move autonomously on the ground in such a way as to be capable of following variable trajectories, guiding movements of the self-propelled unit (2) by means of an automatic guide system in such a way as to situate the measuring instrument (3) in at least a working position relative to the vehicle (100) to be measured, moving the measuring instrument (3) in a vertical direction, thus varying the height of the measuring instrument (3) with respect to the floor, using drive means which are directly controlled by an electronic control unit (24), capturing images of at least a portion (102) of the vehicle (100), and calculating said at least one characteristic attitude parameter of the vehicle (100), on the basis of images of at least a portion (102) of the vehicle (100) captured by said camera (30).

15. The method of claim 14, wherein the step of guiding movements of the self-propelled unit includes initially positioning, the self-propelled unit (2) to be situated in a predetermined intermediate position in the operating space (A), and then finely positioning the self-propelled unit (2) to be moved from the intermediate position in accordance with a relative position of the vehicle (100) in the operating space (A), so as to situate the measuring instrument (3) in the at least one working position relative to the vehicle (100).

16. The method of claim 15, wherein the initial positioning step includes moving the self-propelled unit (2) along a predetermined trajectory starting from a known initial position.

17. The method of claim 15, wherein the fine positioning step includes detecting a position of at least a portion (102) of a vehicle (100) relative to a local frame (xyz) of reference associated to the self-propelled unit (2), and moving the self-propelled unit (2) in such a way that the portion (102) assumes a predetermined position within the local frame of reference (xyz).

18. The method of claim 17, wherein the fine positioning step takes place while the vehicle (100) to be measured is immobile.

19. The method of claim 17, wherein the fine positioning step takes place while the vehicle (100) to be measured is moving.

20. The method of claim 17, further comprising a stage of selecting the part of the vehicle (100) to be measured.

* * * * *